(12) United States Patent
Kim et al.

(10) Patent No.: US 10,137,371 B2
(45) Date of Patent: Nov. 27, 2018

(54) METHOD OF RECORDING AND REPLAYING GAME VIDEO BY USING OBJECT STATE RECORDING METHOD

(71) Applicant: MINKONET CORPORATION, Seoul (KR)

(72) Inventors: Tae Woo Kim, Gyeonggi-Do (KR); Dong Hwal Lee, Gyeonggi-Do (KR); Won Gil Ryim, Gyeonggi-Do (KR)

(73) Assignee: MINKONET CORPORATION, Seoul (KR)

( * ) Notice: Subject to any disclaimer, the term of this patent is extended or adjusted under 35 U.S.C. 154(b) by 51 days.

(21) Appl. No.: 15/190,197

(22) Filed: Jun. 23, 2016

(65) Prior Publication Data
US 2017/0368458 A1    Dec. 28, 2017

(51) Int. Cl.
A63F 13/49    (2014.01)
A63F 13/25    (2014.01)
A63F 13/86    (2014.01)

(52) U.S. Cl.
CPC .............. *A63F 13/49* (2014.09); *A63F 13/25* (2014.09); *A63F 13/86* (2014.09)

(58) Field of Classification Search
CPC ......... A63F 13/49; A63F 13/497; A63F 13/86
See application file for complete search history.

(56) References Cited

U.S. PATENT DOCUMENTS

| | | | |
|---|---|---|---|
| 6,650,329 B1* | 11/2003 | Koike | ............. A63F 13/10 345/419 |
| 2008/0268961 A1* | 10/2008 | Brook | ............. A63F 13/12 463/42 |
| 2016/0354691 A1* | 12/2016 | Fukuda | ............. A63F 13/49 |

FOREIGN PATENT DOCUMENTS

| | | |
|---|---|---|
| JP | H10-216357 | 8/1998 |
| KR | 1020090045645 | 5/2009 |
| KR | 100932675 | 12/2009 |

* cited by examiner

*Primary Examiner* — Jasson Yoo
(74) *Attorney, Agent, or Firm* — JCIPRNET

(57) ABSTRACT

Provided are a method of recording and replaying a game video by using an object state recording method, in which recording and replaying of the game video may be performed by remarkably reducing a data capacity of the game video.

According to the method of recording and replaying a game video by using an object state recording method, a game play video having a small data capacity may be provided at a high image quality.

In addition, according to the method of recording and replaying a game video by using an object state recording method, a calculation load of a game play terminal may be remarkably reduced by recording a game video based on the latest game development environment.

6 Claims, 1 Drawing Sheet

METHOD OF RECORDING AND REPLAYING GAME VIDEO BY USING OBJECT STATE RECORDING METHOD

TECHNICAL FIELD

The present disclosure relates to a method of recording and replaying a game video by using an object state recording method, in which recording and replaying of the game video may performed by remarkably reducing a data capacity of the game video.

BACKGROUND ART

Recently, video services such as YouTube have enabled users to search for videos in various fields and replay them. In addition, as smartphones and tablets have become popular, the number of games that can be enjoyed not only on personal computers or game-dedicated terminals but also on mobile devices has increased, and the number of users playing these games is also on the rise. Accordingly, more and more users are enjoying games by uploading their game play videos to a video service server or watching game videos uploaded by other users.

On the side of server operators providing such game videos, there are several kinds of difficulties in terms of receiving, recording and transmitting videos having a relatively large data capacity.

In addition, it is inconvenient also for users, who record and upload a game video to a video server, to collect images displayed on a screen in real-time on a game player terminal and record the collected images as a video file, which is a set of continuous image frames. This conventional method places a lot of load on an arithmetic unit of a user terminal, disturbing a game play by, for example, interrupting a game play or slowing the speed of a game play. Some methods according to the related art include recording a video after intentionally lowering a video quality to ensure a low load on an arithmetic unit of a user terminal. If a video is recorded using a low-resolution terminal and replayed using another terminal, the image quality of the video may be degraded, diminishing the interest of the user.

DESCRIPTION OF THE INVENTION

Provided is a method of recording and replaying a game video by using an object state recording method, in which recording and replaying of a game video may be performed by remarkably reducing a data capacity of the game video.

According to an aspect of the present invention, there is provided a method of recording and replaying a game video by using an object state recording method, wherein the game video is a video of a game developed using a game development tool whereby things, characters, and backgrounds appearing in virtual space defined three-dimensionally within the game are defined as objects and states of the objects displayed on a screen in the virtual space are created as image frames at predetermined time intervals and displayed on the screen, the method including: (a) while the game is being played, if a new object appears in the virtual space, recording an identification number of the object, numerical data of position coordinates and a direction of the object in the virtual space, and a serial number of an image frame in which the object appeared, in a replay data file as appearance information; (b) if the object that appeared in step (a) moves in the virtual space, recording numerical data defining a motion of the object for each serial number of the image frame, in the replay data file as motion state information; (c) if the object that appeared in step (a) exits from the virtual space, recording the identification number of the exiting object and a serial number of an image frame in which the object exits, in the replay data file as exit information; and (d) searching for shape information of the object corresponding to the identification number of the object recorded in the replay data file, in a library of the game so as to dispose the object in the virtual space based on the appearance information corresponding to the serial number of the image frame, constructing the object moving based on the motion state information, in the virtual space, and creating a replay image frame in which the object is removed from the virtual space based on the exit information and rendering the replay image frame on the screen.

According to the method of recording and replaying a game video by using an object state recording method of the present invention, a game play video having a small data capacity may be provided at a high image quality.

According to the method of recording and replaying a game video by using an object state recording method of the present invention, a calculation load of a game play terminal may be remarkably reduced by recording a game video based on the latest game development environment.

DETAILED DESCRIPTION OF THE INVENTION

Figure 1:
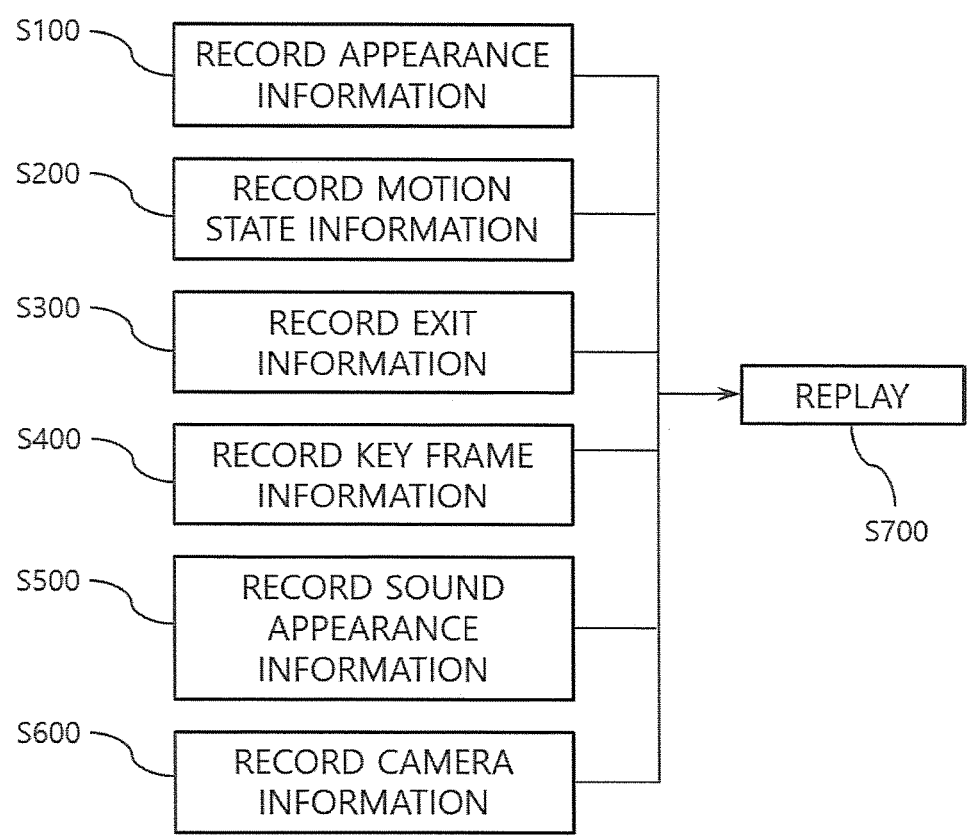
FIG. 1 is a flowchart of a method of recording and replaying a game video by using an object state recording method, according to an embodiment of the present invention.

Hereinafter, a method of recording and replaying a game video by using an object state recording method according to the present invention will be described more fully with reference to exemplary embodiments of the present invention.

The method of recording and replaying a game video by using an object state recording method, according to the present embodiment, is used in games developed using a game development tool that enable to develop a game based on three-dimensional objects in three-dimensional space.

Game development tools such as Unity3D are widely used to develop three-dimensional games. Such conventional game development tools as these enable game developers to easily create objects used in games (such as characters, props, backgrounds, weapons) and dispose the objects in virtual space of the games so that they are moved or activated. Such game development tools are designed to display a game image on a screen in units of frames. For example, Unity3D constructs a game image by creating images at 50 frames per second and sequentially displaying the images on a screen. When a position shift or a motion of three-dimensional objects in virtual space is defined by a game developer, the game development tool constructs the shape of a game by automatically calculating a real-time shape of an object according to a game player's manipulation and rendering an image at 50 frames per second on a screen. The frame per second (FPS) of a game shape may vary according to game development tools. A motion of objects appearing in a game also consists of frames. For example, a motion of a gun shooting bullets in a game is recorded as three-dimensional mesh data consisting of 100 frames. When an operation of firing a gun in a real game is performed, the gun is sequentially deformed according to the 100 frames at a preset position in virtual space, and a game engine renders in real-time images mapped to respective frames of all objects in virtual space to display the image on the screen. Although operations have the same number of frames, videos may be realized at varying speeds according to a mapping method between a frame serial number of the operations and a serial number of an absolute frame of the entire virtual space time of a game.

The present invention provides a method of effectively recording and replaying a game video by using the latest game development environment, compared to a conventional streaming method.

The method of recording and replaying a game video by using an object state soring method as described above may be included in a game program at the stage when a developer develops a game and integrated as one of functions of the game program. For example, during game play, if a user clicks a record button for recording a game play situation, a game video is recorded and recorded as a replay data file according to the present invention. The user may replay the video recorded in the replay data file by using a game program or a dedicated replay program.

The method of recording and replaying a video according to the present invention under the above-described game play environment will be described in detail below.

FIG. 1 is a flowchart of a method of recording and replaying a game video by using an object state recording method according to an embodiment of the present invention.

First, a game engine monitors objects existing in virtual space of a game while a user is playing the game. The objects may be classified, for example, as objects existing in virtual space from the start of the game, objects appearing in or disappearing from the virtual space depending on a game play situation, objects fixed at particular positions of the virtual space without moving after they are disposed, and objects moving or changing their shape according to game situations. According to the method of recording and replaying a game video by using an object state recording method according to the present invention, an appearance or an exit and a stationary state or a moving state of objects in virtual space are kept track of as described below.

While the user is playing the game, if a new object appears in the virtual space, an identification number of the object, numerical data of position coordinates and a direction of the object in the virtual space, and a serial number of an image frame in which the object appeared are recorded in a replay data file as appearance information (step (a), S100). When the user transmits a command to start recording by, for example, pressing a record button, objects in virtual space are monitored, and if a new object appears in the virtual space, an identification number of the object and a serial number of an image frame at a point of time when the object appeared are recorded in the replay data file. In addition, numerical data of position coordinates and a direction of the object indicating at which position and in which direction the object is disposed in the virtual space is also recorded.

Objects used in the game are already recorded in a library used by the game engine, and thus, just with identification numbers of the objects, the objects may be searched for in the library to configure a video later. Meanwhile, as the game is displayed on the screen in units of frames rendered at predetermined intervals in the present invention as described above, recording of a serial number of an image frame in which the object appeared is the same as recording time when the object appeared in the virtual space. Information defined by an identification number of an object that appeared as described above, coordinates and a direction of the object, and a serial number of an image frame in which the object appeared will be referred to as appearance information. If other information needed to dispose the object in virtual space for the first time is present, this information may also be recorded as the appearance information.

When the user starts recording the game while a user is playing a game, identification numbers, position coordinates, and directions of all objects existing already in the virtual space of the game are recorded as appearance information in accordance with a serial number of a first image frame.

Among the objects appearing in the virtual space as described above, objects such as backgrounds or props do not move but are fixed. The fixed objects need only be displayed until they disappear after they are disposed in the virtual space, and thus, data regarding the fixed objects does not have to be additionally recorded to create an image frame later.

However, regarding moving objects, changes in states of the objects have to be kept track of to create image frames with time in order to be able to replay a game video later.

According to the present embodiment, if the object appeared in step (a) is moving in the virtual space, numerical data defining motion of the object corresponding to each image frame serial number is recorded as motion state information in the replay data file (step (b), S200). That is, a motion of an object with time is recorded in the replay data file. A motion of an object may be recorded using two methods. If the object moves without changing its shape, position coordinates and a direction of the object corresponding to a serial number of each image frame are recorded in the replay data file. That is, positions and directions of the objects with time are recorded. If the object moves while its shape changes (for example, if a character walks or a tool is operated), in addition to a position and a direction of the object corresponding to each image frame serial number, an identification number of a motion of the object recorded in the library of the game engine (that is, an identification number indicating a motion type) and a serial number of a frame defining the motion are recorded in the replay data file in accordance with the image frame serial number. If an object moves with a shape change, the motion is already recorded in the library of the game engine, and how the motion is performed (how the three-dimensional shape of the object changes) is recorded in units of frames. Thus, if frame serial numbers of an object motion respectively corresponding to serial numbers of image frames based on which a video is created are known, a change in the shape of the object with time may be realized. According to circumstances, a serial number of an image frame and a frame serial number of an object motion may be mapped to each other in a one-to-one correspondence. In this case, time of an object motion and time of a game video may flow at the same rate. If the mapping is performed such that a serial number of an object motion increases according to an arithmetic progression with a common difference of three with respect to an image frame serial number, the motion of the object in a game video is three times faster than the previously described case. Information recorded in step (b) as described above is referred to as motion state information.

According to the above-described method, objects appearing in virtual space and changes in moving objects among the objects with time may be recorded using a relatively small data capacity.

Next, if the object appeared in step (a) exits from the virtual space, the serial number of the exiting object and a serial number of an image frame in which the object has exited are recorded as exit information in the replay data file (step (c); S300). The object, appearance information of which is recorded in step (a), is treated as existing in the virtual space regardless of whether the object moves or not, and an image frame is created as the object is placed in the virtual space. If an object exits from the virtual space as a character dies or an item is destroyed, the time of exit is recorded in the replay data file in the form of a serial number of an image frame. That is, an identification number of the object that has exited and a serial number of an image frame at a point of exit of the object are recorded in the replay data file as exit information. When the exit information is recorded, motion of the exiting object is not recorded in step (b) described above. In this way, a capacity of the replay data file may be reduced.

The method of recording a game video according to the present embodiment is completed in the above-described process.

An operation of replaying the video recorded in the form of the replay data file as described above is performed in step (d). In step (d), the game video is replayed by rendering the game video on the screen by using the appearance information, the motion state information, and the exit information recorded in the replay data file and information of game objects recorded in the library used by the game engine in S700. Each serial number of image frames according to the passage of time may have appearance information, motion state information, and exit information. Step (a) is performed such that a serial number of a first image frame includes appearance information of all objects seen on the screen, including a basic background object of the game, and of all objects that are not seen on the screen but exist in the virtual space. By using the appearance information, shape information of an object corresponding to an identification information of the object included in the appearance information is searched for from in the library of the game so as to dispose the object in the virtual space, in which the game video is replayed, and a replay image frame (an image frame created during replaying of a game video performed using a replay data file will be referred to as a replay image frame to distinguish the replay image frame from an image frame displayed on a screen during game play described above) is created. Then, next replay image frames are sequentially rendered on the screen. Motions of objects are realized based on the above-described motion state information to generate next replay image frames. As the play time progresses, (according to progression of serial numbers of image frames), if appearance information is present, a new object is disposed in the virtual space. If exit information is present according to progression of the play time, a corresponding existing object is removed from the virtual space. In regard to motion state information of an object whose shape changes, as described above, a game shape is replayed by creating a replay image frame in which the changing shape of the object is constructed according to a corresponding relation between a serial number of a frame of the motion and a serial number of an image frame.

By recording and replaying a video by recording appearance information, motion state information, and exit information in units of image frames as described above, a game video may be recorded and replayed based on a significantly small data capacity compared to the conventional method of creating a video file, in which images displayed on a screen are collected and recorded. In addition, as the entire progress of the game is recorded in the replay data file, the video may be replayed by adjusting a video quality as desired according to situations. In addition, the video may be edited in various manners by modifying the appearance information, the motion state information, and the exit information included in the replay data file. Instead of using a video editing method that includes cutting and pasting a predetermined temporal section of a video, video editing over a broader range, such as replacing the shape of an object appearing in a video or modifying a movement of an object may be conducted.

Meanwhile, according to the method of recording and replaying a game video by using an object state recording method of the present invention as described above, objects appearing in the virtual space are cumulatively displayed based on progression of serial numbers of image frames with time. That is, it may be difficult to know entire information of objects to be displayed on a screen only based on appearance information, motion state information, and exit information corresponding to a serial number of an image frame at a particular point.

Thus, if a user gives a command to replay a replay data file from a predetermined middle point instead of from the start, a video is displayed on the screen as described below.

That is, changes in appearance information, motion state information, and exit information from the start point of the replay data file to a replay starting point appointed by the user are calculated, and then a replay image frame is created and rendered from the replay starting point.

According to circumstances, a period that the user may feel inconvenient may take when replaying the replay data file from a predetermined replay starting point by using the above-described method. That is, if a duration of a video recorded in the replay data file is relatively long and an arithmetic capability of a system replaying the video is poor, it may take a relatively long time to calculate changes in objects from a first replay image frame to a replay starting point.

In order to address this problem, key frame information may be additionally recorded in a replay data file.

That is, when recording a video in the form of a replay data file in steps (a), (b), and (c) described above, key frame information as described below is additionally recorded in the replay data file. Identification numbers of all objects displayed in the virtual space, numerical data of position coordinates and directions of the objects in the virtual space, and serial numbers of image frames are recorded as key frame information at predetermined image frame intervals in the replay data file (step (e); S400). Intervals between image frames, at which key frame information is recorded, may be a predetermined time interval (for example, every one minute), or key frame information may also be recorded when a change defined by a game developer at the game development stage is made in a situation of a game, when there is a change in a background, or at a point when a level changes. In a similar manner as appearance information, key frame information includes identification numbers of all objects existing in virtual space and information needed to create replay image frames by using the objects. For example, if an object is performing a motion, a serial number of the motion and a serial number of a frame corresponding to the motion at that moment are also recorded as key frame information in addition to a serial number of an image frame corresponding to a key frame.

If key frame information is included in the replay data file, and when the user replays a video from a middle replay starting point appointed by the user, step (d) is performed using the key frame information. That is, instead of calculating changes in objects from the first image frame to the replay starting point, changes in the objects are calculated from a key frame just before the replay starting point and then a replay image frame is created to be rendered. As information of most objects that are to be displayed on a screen are included in the key frame information, after disposing the objects in virtual space by using the key frame information, changes up to the replay starting point are calculated by using motion state information, and then a replay image frame is created from the replay starting point. By using the key frame information as described above, there is no need to calculate changes in every object from the first image frame to the replay starting point.

The method of recording and replaying a game video by using an object state recording method according to the present embodiment is described above. Hereinafter, a method of recording and recording a game video by adding audio information to the video described above will be described.

When a game is played, diverse sound effects and background music are provided, and such audio effects are also recorded in the library of the game engine as individual sound objects.

As recording of a game video is started, whether replay of a new sound object starts is monitored while a user is playing the game, and an identification number of the sound object and a serial number of an image frame in which the replaying of the sound object starts are recorded in a replay data file as sound appearance information (step (f); S500). The sound object is recorded in the replay data file in a similar manner to the method of recording appearance information described above. By recording just a point when replaying of the sound object starts, the sound object may be easily replayed at an appropriate point when replaying a recorded video.

That is, in step (d), while rendering a replay image frame, audio information of the sound object corresponding to the identification number of the sound object recorded in the replay data file is searched for in the game library, and the sound object is replayed based on sound appearance information corresponding to the serial number of the image frame.

The information of the sound object described above may also be included in the above-described key frame information. That is, when an identification number of a sound object replayed based on an image frame serial number corresponding to a key frame and a replay duration of the sound object are recorded, even when a video is replayed from the middle of the replay data file, the video may be replayed by effectively synchronizing the sound object and a screen of the replayed video with each other.

Depending on types of game, a function of providing motion of objects moving in the virtual space as various camera views or a function of allowing a user to select a camera view to be displayed on the screen may be provided.

In this case, motion of a camera may be recorded as described below, and a video may be replayed according to the recorded camera motion.

While the user is playing the game, camera information including a position and a direction of a virtual camera in virtual space, which captures an image of the virtual space and displays the image on a screen, is recorded in a replay data file (step (g); S600). This is similar to the method of recording appearance information of an object described above.

If the position or the direction of the virtual camera changes or a focus of the virtual camera changes, in step (b), camera information corresponding to each image frame may be added to motion state information and recorded in the replay data file.

When replaying the replay data file including the camera information as described above, a replay image frame is created and rendered on a screen by reflecting camera information corresponding to a serial number of each image frame.

As described above, by editing the camera information included in the replay data file, the replay data file may be edited to ensure replay of a more dramatic game play situation than the actual game play.

While this invention has been particularly shown and described with reference to various embodiments thereof, the present invention should not be construed as being limited to the embodiments set forth herein; various changes, combinations, and modifications may be made therein without departing from the spirit and scope of the present invention as defined by the appended claims.

What is claimed is:

1. A method of recording and replaying a game video by using an object state recording method in a computer system, wherein the game video is a video of a game developed using a game development tool whereby things, characters, and backgrounds appearing in virtual space defined three-dimensionally within the game are defined as objects and states of the objects displayed on a screen in the virtual space are created as image frames at predetermined time intervals and displayed on the screen, the method comprising:
   (a) while the game is being played, when a new object appears in the virtual space, recording an identification number of the object, numerical data of position coordinates and a direction of the object in the virtual space, and a serial number of an image frame in which the object appeared, in a replay data file as appearance information;
   (b) when the object that appeared in step (a) moves in the virtual space, recording numerical data defining a motion of the object for each serial number of the image frame, in the replay data file as motion state information;
   (c) when the object that appeared in step (a) exits from the virtual space, recording the identification number of the exiting object and a serial number of an image frame in which the object exits, in the replay data file as exit information; and
   (d) searching for shape information of the object corresponding to the identification number of the object recorded in the replay data file, in a library of the game so as to dispose the object in the virtual space based on the appearance information corresponding to the serial number of the image frame, constructing the object moving based on the motion state information, in the virtual space, and creating a replay image frame in which the object is removed from the virtual space based on the exit information and rendering the replay image frame on the screen.

2. The method of claim 1, wherein in (d), when the replay data file is replayed from a replay starting point appointed by the user, changes in the objects up to the replay starting point are calculated by using the appearance information, the motion state information, and the exit information of the replay data file, and then a replay image frame is created and rendered from the replay starting point.

3. The method of claim 1, further comprising (e) recording, at predetermined image frame intervals, identification numbers of all objects displayed in the virtual space, numerical data of position coordinates and directions of all objects in the virtual space, and serial numbers of the image frames in the replay data file as key frame information, wherein in (d), when the replay data file is replayed from a replay starting point appointed by the user, objects are disposed in the virtual space by using the key frame information corresponding to a point just before the replay starting point, and changes in the objects up to the replay starting point are calculated by using the motion state information, and then a replay image frame is created and rendered from the replay starting point.

4. The method of claim 1, wherein when a shape of the object is changed in (b), the changed shape of the object is recorded in advance at predetermined intervals, and a change in the shape of the object and a rate of the change are recorded in the replay data file by mapping a serial number of each shape of the shape changing object and the serial number of the image frame to each other to be recorded as the motion state information, wherein in (d), the serial number of the shape of the object corresponding to the serial number of the image frame is searched for in the library of the game to create a replay image frame to display the change in the shape of the object.

5. The method of claim 1, further comprising (f) recording, when replaying of a new sound object starts while the game is being played, an identification number of the sound object and a serial number of an image frame in which the replaying of the sound object starts, in the replay data file as sound appearance information, wherein in (d), while the replay image frame is being rendered, audio information of the sound object corresponding to the identification number of the sound object recorded in the replay data file is searched for in the library of the game and the sound object is replayed based on the sound appearance information corresponding to the serial number of the image frame.

6. The method of claim 1, further comprising (g) recording camera information including a position and a direction of a virtual camera in the virtual space, in the replay data file, wherein the virtual camera captures an image of the virtual space and displays the image on a screen while the game is being played, wherein when the position or the direction of the virtual camera or a focus of the virtual camera changes, the camera information corresponding to each image frame is added to the motion state information to be recorded in the replay data file in (b), wherein in (d), the replay image frame corresponding to the camera information for each image frame serial number is created and rendered on the screen.

* * * * *